Patented Dec. 30, 1941

2,267,763

UNITED STATES PATENT OFFICE 2,267,763

FLUX AND METHOD OF PRODUCING SAME

Johann S. Streicher, Newark, N. J., assignor to The American Platinum Works, Newark, N. J., a corporation of New Jersey No Drawing. Original application November 8, 1940, Serial No. 364,794. Divided and this application May 3, 1941, Serial No. 391,714

2 Claims. (Cl. 148—26)

This invention relates to a flux for use primarily in connection with soldering operations involving soldering with hard metal solder.

This application is a division of my co-pending application Serial No. 364,794 filed November 8, 1940, which in turn is a continuation in part of my earlier application Serial No. 250,931 filed January 14, 1939.

Fluxes are used in connection with soldering operations in order to prevent oxidation of the heated metal surfaces and of the solder itself, and to clean the metal surfaces from any tarnish or impurities harmful to the free spreading of the solder. Fluxes are usually applied, by brushes or otherwise, in the form of a thin film to the surfaces over which the liquid solder is to spread and may also be applied to the solder itself. Hard metal solders for which the present flux is primarily intended comprise such solders as silver or brass solders and are used for instance in the soldering of such metals as silver, copper, iron, nickel and various alloys containing one or more such metals including, for instance, stainless steel.

The common fluxes generally used for silver solders comprise borax or boric acid or mixtures thereof. Such fluxes when heated are generally transformed into viscous masses having no great liquidity, and due to their great surface tension they offer a great resistance to the flow of the liquid solder. Such fluxes when heated tend to develop gas bubbles and do not have a definite and predetermined melting point but melt gradually like glass irrespective of whethter or not such fluxes also contain a small amount of modifying agents. Boric acid for instance is gradually transformed into a viscous liquid, beginning to thicken at 871° C. and increasing in viscosity with decreasing temperatures until it becomes solid at 565° C. Also, such fluxes are not sufficiently effective in the production of perfect solder joints with such metals, for instance stainless steel, which form or carry surface oxide layers difficult to remove.

It has been the general belief in connection with soldering operations involving the use of hard metal solders that any protective fluxes, particularly a viscous or glassy flux, will be satisfactory so long as the right solder is used, with the result that in such soldering operations it has been practice to use a single flux or a limited number of fluxes and to use a great number of hard metal solders, particularly silver solders, a new solder having usually been produced for every apparently different, but in reality similar, problem.

It is one object of my invention to provide a flux which when heated has a low surface tension and is highly liquid, thus permitting the free and unimpeded flow of hard metal solders, particularly of silver solders. It is another object of my invention to provide a flux having a definite melting point and to provide a series of fluxes similar in composition to each other melting at different but definite melting points, each such flux having a low surface tension. Other objects and advantages of my flux will be apparent from the description hereinafter following.

The flux according to my invention is produced by reacting a mixture of boric acid and sodium fluoride in water in certain specified proportions. The reaction takes place spontaneously at room temperature if the mixture is subjected to a thorough grinding procedure. The reaction also takes place without the necessity of thorough grinding when the mixture is heated to a temperature of about 110° C. to 120° C. and more, whereafter the reacted mixture is cooled. The reaction is exothermic, evolving considerable heat, and produces a hydrated polyboric acid compound, probably tetraboric acid and pentaboric acid, containing water as a constituent thereof. The compound also seems to contain sodium fluoride as a constituent thereof. When heated the reacted mixture quickly loses any excess of water, but the water which is contained in the boric acid compound as a constituent thereof is released only slowly and gradually and only in part.

The reaction compound melts at a definite melting point and when molten has a surprisingly low surface tension. The molten mass, when applied to or produced on metal surfaces, has a considerably greater cleaning capacity than other fluxes comprising boric acid, borax, or mixtures thereof, as the complex boric acid compound thus produced develops, when heated and fused, a strong acidity, contrary to boric acid which when heated and fused is transformed into amorphous boric oxide which is a glassy substance having in the fused state no or little acid character.

The flux comprising the boric acid compound described makes it possible to effect soldering operations with hard metal solder with greater ease and better technical performance.

The melting points of the series of fluxes according to my invention are low and correspond to the melting points of the commonly used silver solders. The liquidity of such fluxes is high and the surface tension thereof is low, the liquidity gradually decreasing with an increase in the boric acid content.

Such fluxes of low surface tension and definite individual melting points are produced from mixtures of 45% to 29% sodium fluoride and 55% to 71% boric acid, such fluxes having melting points within a range from 843° C. to 715° C.

The hydrated complex polyboric acid fluxes are best produced by first mixing together, preferably in a mortar or grinding machine, the sodium fluoride and boric acid in the specified proportions and then adding the proper amount of water.

Since boric acid does not readily wet water, there may be added to the water a trace of wetting agent. The liquid crystallizes while evolving heat to result in a hard mass which is then ground into a thin paste. The flux may also be produced by dissolving sodium fluoride in hot water and then adding boric acid, the hydrated complex polyboric acid compound crystallizing after cooling. For instance, a mixture of commercial boric acid, dehydrated commercial sodium fluoride, and water containing a trace of Lamepon A as wetting agent, is finely ground until the mass is transformed into a thick gray liquid which on standing turns itself by crystallization into a white mass which is then thoroughly ground and thereby transformed into a smooth paste constituting the flux.

The hydrated flux forms a very stable base and can be kept in such state for an indefinite length of time as distinguished from other fluxes which tend to cake and solidify in their jars after a relatively short time.

The flux can be transformed into dry flux powder by heating the crystallized acid compound either as such or in the form of the hydrated flux paste at about 110° C. to volatilize the excess of water otherwise necessary for keeping the hydrated flux in the state of a stable paste and by then comminuting the dehydrated or partly dehydrated solid mass into a fine powder. A very good non-rising flux can be obtained by fusing the flux in hydrated state and grinding the resulting crystal cakes into fine powder. The dehydrated fluxes are highly hygroscopic.

In addition to the advantages of low surface tension and highly active cleaning capacity of my flux, the provision of a series of such fluxes each of which has a definite individual melting point makes it possible to perform soldering operations with hard metal solder in such manner that the flux is selected for the desired solder instead of using a special solder for the flux used. By thus varying the flux, it is possible to decrease the number of hard metal solders to a minimum. Many soldering problems can thus be solved primarily by the selection of a flux having the proper physical properties, rather than by resorting to selecting a special solder from a complicated and great number of hard metal solders. Also, by thus divorcing the soldering operation from the great number and variety of solders and putting the emphasis on the selection of a proper flux, it is possible to give proper consideration to other qualities of solders which it was heretofore not always possible to consider in the selection of a proper solder. Thus, the color of the solder can be such as to approximate the color of the metal to be soldered, or the silversmith can use a silver solder which does not change the silver content of the article to be soldered. Also, some solders will diffuse more readily than others with the metals to be soldered, thus producing a firmer bond; silver solders for instance having a high copper and zinc content will diffuse more readily with nickel alloys than will solders having a high silver content. Best results in soldering operations are obtained, contrary to general belief, with a flux having a low surface tension and a melting point near the melting point of the hard metal solder. The melting point of the flux is preferably equal to or slightly lower than the melting point of the hard metal solder with which it is used. While the fluxes according to my invention can be used in any desired manner, by applying them to the metal to be soldered or applying them to the solder itself, I have found that they are also exceptionally adapted in connection with salt bath furnaces recently introduced for silver brazing operations, since they remain in an active state for long periods of time.

Thus my invention provides an exceptionally advantageous flux of great liquidity and low surface tension of definite and low melting point of great cleaning capacity and free from undesirable shortcomings. The flux spreads easily and freely over the metal surface to which it is applied and thus permits the hard metal solder to also spread easily over the metal surface. It makes possible perfect bonds in many cases where other fluxes are unsatisfactory. By providing a series of such fluxes each having a different but definite melting point, it is possible to select a suitable flux for any hard metal solder, thus decreasing the number of hard metal solders and permitting the selection of such solders for special properties not connected with requirements imposed by the particular flux used. The flux is not poisonous in use and its stability and effectiveness are such that one and the same flux can be used for many successive soldering operations without losing its effectiveness.

The fluxes according to my invention consist essentially of the reaction product produced in a mixture of boric acid and sodium fluoride in suitable proportions, and may contain water as when it is in the hydrated state. The reaction mixture and the flux itself should be substantially free from other substances, but may contain small quantities of other substances so long as the fundamental characteristics of my polyboric acid compound flux are not substantially altered in a detrimental manner.

What I claim is:

1. The method of producing a flux for hard metal solder, comprising reacting an aqueous mixture of boric acid and sodium fluoride in the proportions of fifty-five (55%) per cent to seventy-one (71%) per cent boric acid and forty-five (45%) per cent to twenty-nine (29%) per cent sodium fluoride.

2. A flux for hard metal solder, comprising a polyboric acid reaction product of an aqueous mixture of fifty-five (55%) per cent to seventy-one (71%) per cent boric acid and forty-five (45%) per cent to twenty-nine (29%) per cent sodium fluoride.

JOHANN S. STREICHER.